United States Patent
Yamaguchi et al.

(10) Patent No.: US 6,655,839 B2
(45) Date of Patent: Dec. 2, 2003

(54) LINEAR GUIDE DEVICE

(75) Inventors: Hiroki Yamaguchi, Gunma (JP); Ryoichi Sato, Gunma (JP); Shinichi Kasuga, Gunma (JP); Kenji Kano, Gunma (JP); Soichiro Kato, Gunma (JP); Nobuaki Fujimura, Gunma (JP)

(73) Assignee: NSK Ltd., Tokyo (JP)

( * ) Notice: Subject to any disclaimer, the term of this patent is extended or adjusted under 35 U.S.C. 154(b) by 61 days.

(21) Appl. No.: 09/898,079

(22) Filed: Jul. 5, 2001

(65) Prior Publication Data

US 2002/0025087 A1 Feb. 28, 2002

(30) Foreign Application Priority Data

Jul. 5, 2000 (JP) .................... P. 2000-203324
Jul. 7, 2000 (JP) .................... P. 2000-207181

(51) Int. Cl.$^7$ .............................. F16C 29/08
(52) U.S. Cl. ............................. 384/45; 384/49
(58) Field of Search ..................... 384/43, 45, 49, 384/51, 521

(56) References Cited

U.S. PATENT DOCUMENTS

| | | | | |
|---|---|---|---|---|
| 3,208,806 A | * | 9/1965 | Grolmann et al. | 384/520 |
| 3,455,616 A | * | 7/1969 | George et al. | 384/520 |
| 5,927,858 A | * | 7/1999 | Agari | 384/45 |
| 6,095,009 A | * | 8/2000 | Takagi | 74/424.88 |
| 6,176,149 B1 | * | 1/2001 | Misu | 384/45 |
| 6,347,558 B1 | * | 2/2002 | Miyaguchi et al. | 384/43 |

FOREIGN PATENT DOCUMENTS

| | | | |
|---|---|---|---|
| DE | 2838329 | * | 3/1980 |
| JP | 2000-120825 A | | 4/2000 |

OTHER PUBLICATIONS

Patent Abstracts of Japan for publication No. 2000–120825, published Apr. 28, 2000.

* cited by examiner

*Primary Examiner*—William C Joyce
(74) *Attorney, Agent, or Firm*—Sughrue Mion, PLLC

(57) ABSTRACT

A linear guide device in which a rate of change expressed as "Dmax–Dmin", becomes extremely small where Dmax and Dmin are respectively a local maximum and a local minimum of D, expressed as (dx2–dx1)/dx, which is produced when a steel ball B moves a distance corresponding to a rolling element-to-rolling element span, dx1 is a minute movement quantity of a steel ball B when it moves from one space defined between rolling element rolling grooves 3 and 31 of an element endless circulating raceway 7, to one of curved element circulating R parts 6, and dx2 is a minute movement quantity of another steel ball B when it moves from the other curved element circulating R part 6 to the space while the former steel ball is moved by the minute movement quantity dx1.

3 Claims, 13 Drawing Sheets

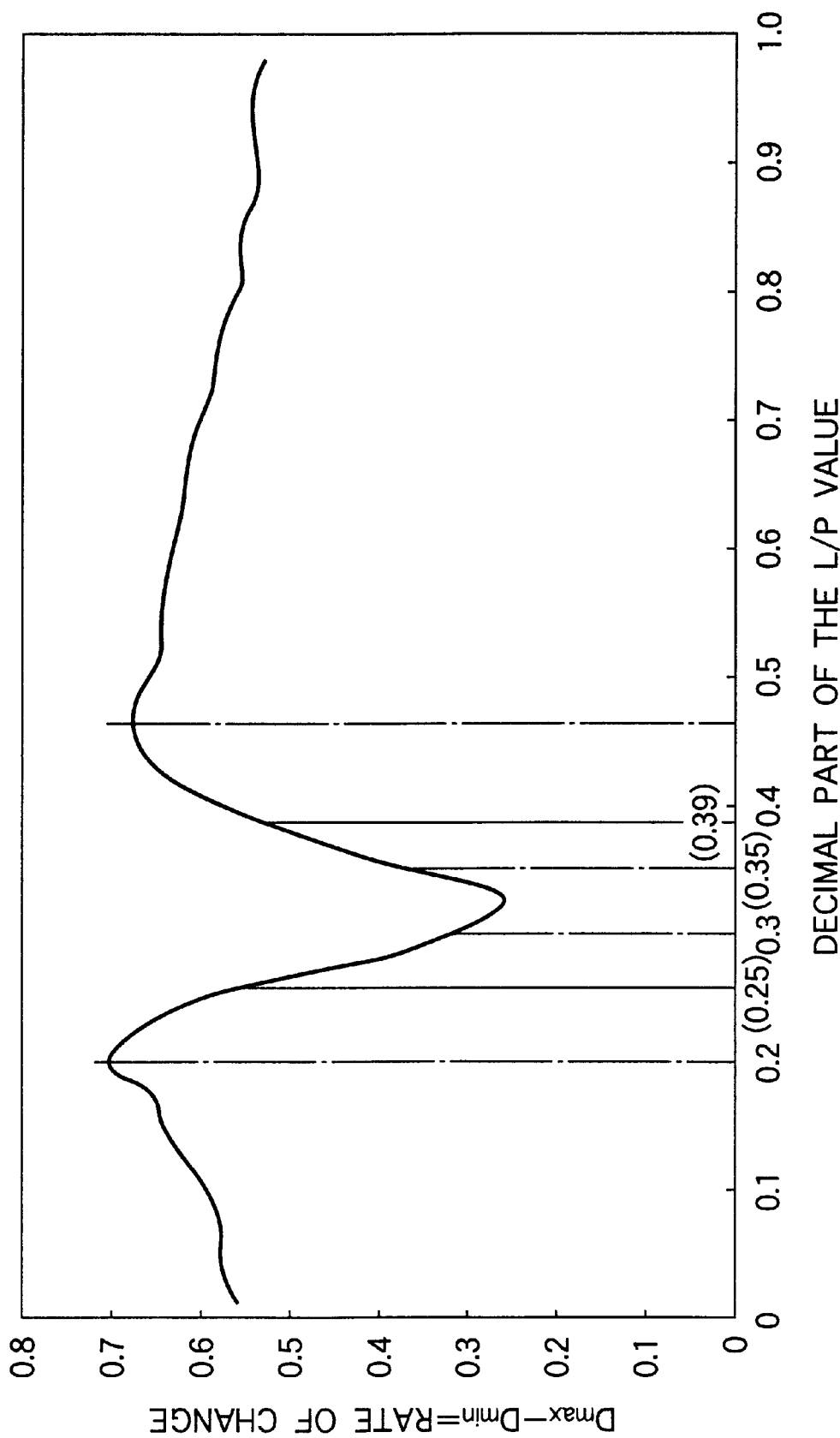

LINEAR GUIDE DEVICE

BACKGROUND OF THE INVENTION

The present invention relates to a linear guide device, and particularly a linear guide device in use for industrial machines and the like.

Further, the present invention also relates to a linear guide device including a slider in which spacers are each interposed between the rolling elements adjacent to each other in the circulating direction.

A conventional linear guide device of this type, as shown in FIG. 1, is provided with an axially extending guide rail 1 and a slider 2 slidably mounted on the guide rail 1.

Element rolling grooves 3, while linearly and axially extend, are formed on both sides of the guide rail 1. Element rolling grooves 31, which linearly extend (see FIG. 2), are formed in the inner side walls of sleeve parts 4 of a slider body 2A of the slider 2 in a state that the rolling element rolling grooves face the rolling element rolling grooves 3.

A number of steel balls B as rolling elements are rollably in a space defined between the rolling element rolling grooves 3 and 31 facing each other. The slider 2 is movable on and along the guide rail 1 through the rolling of the steel balls B. With its movement, the steel balls B interposed between the guide rail 1 and the slider 2 roll toward an end of the slider body 2A of the slider 2. To continuously move the slider 2 in the axial direction, it is necessary to endlessly move those steel balls B.

To this end, raceways 10 axially pass through the sleeve parts 4 of the slider body 2A, respectively. End caps 5 are provided at both ends of the slider body 2A. Element circulating R parts 6 (see FIG. 10), semicircularly curved, are formed in the end caps 5, while communicating with the space defined between the rolling element rolling grooves 3 and 31 and the raceways 10 (as a rolling element return passages). Those linear element raceways and the element circulating R parts are combined to form an element endless circulating raceway 7.

Thus, in the linear guide device, the element endless circulating raceway 7 includes the raceway 10, the spaces defined between the rolling element rolling grooves 3 and 31, and the curved element circulating R parts 6. A difference (which is maximized at a phase where a steel ball position reaches a tongue tip C) is present between a minute movement quantity dx1 and a minute movement quantity dx2 (FIG. 10). The minute movement quantity dx1 is a minute movement quantity of a rolling element when in the element endless circulating raceway 7, it moves from one space (load region) defined between the rolling element rolling grooves 3 and 31 to one (non-load region) of the curved element circulating R parts 6. The minute movement quantity dx2 is a minute movement quantity of another rolling element when it moves from the other curved element circulating R part 6 (non-load region) to the space (load region) defined between the rolling element rolling grooves 3 and 31 in accordance with the movement of the former rolling element by the minute movement quantity dx1. The difference causes a zig-zag motion of the steel balls and a great variation of dynamic frictional force to hinder a smooth revolving motion of the steel balls (their motion along the circulating raceway). This makes it difficult to improve the operability of the device. Reference is made to FIG. 11 to explain the cause to generate the difference between the minute movement quantities dx1 and dx2. When the center of a steel ball, which is on the linear part of the element endless circulating raceway 7, moves from a point A1 to another point A2, the center of another steel ball, which is on the curved part, moves from a point B1 to another point B2. It is geometrically clear that a movement quantity of the steel ball from A1 to A2 is different from a movement quantity of the steel ball from B1 to B2. This is the cause to generate the difference between the minute movement quantities dx1 and dx2.

This is one of problems in the conventional linear guide device.

As shown in FIG. 4, a spacer 9 having concave surfaces 8 on both side facing steel balls B located adjacent to each other in an element endless circulating raceway 7 is located such that the concave surfaces 8 of it are in contact with the adjacent steel balls B. JP-A-4-27405 discloses a technique to improve the operability. In the technique, some elastic spacers are each interposed between the adjacent rolling elements in the rolling element train. The elastic spacers function to absorb a gap or gaps which will be created in the circumferential direction in the rolling element train. JP-A-5-126148 discloses another technique in which to appropriately tighten the rolling element train, one of the spacers each interposed between the adjacent rolling elements is used to adjust the element-to-element pitch. The technique eliminates the gap that will be created in the rolling element train, and hence improves the operability.

In the conventional linear guide device, the element endless circulating raceway is constructed with a plurality of parts. To absorb the raceway length variation in the produces, caused by part machining error or the like, and to appropriately tighten the rolling element train, the spacer having a highly accurate and complicated configuration (e.g., a spacer having an elastic part or a movable part) is required. Manufacturing such a spacer is difficult. Since one or a plurality of spacers thus specified are used, the improvement of the operability is not satisfactory frequently.

When the raceway length variation is beyond an adjusting ability of the spacer, an excessive compression force acts on the rolling element train. As a result, the operability is considerably deteriorated, a harsh grating noise is generated.

This is the other of problems in the conventional linear guide device.

SUMMARY OF THE INVENTION

Accordingly, an object of the present invention is to provide a linear guide device which secures a smooth revolving motion of rolling elements and improves the device operability without causing the zig-zag phenomenon of the rolling elements and a great variation of dynamic frictional forces.

The above-mentioned object can be achieved by a linear guide device, according to the present invention, comprising:
  a plurality of rolling elements;
  a guide rail extending in an axial direction thereof and having a rolling element rolling groove which is formed in a side wall thereof and is extended in the axial direction; and
  a slider including a rolling element rolling groove, which faces the rolling element rolling groove of the guide rail, the slider being supported in a manner that the slider is axially movable through the rolling of the rolling elements put in a space defined between the rolling element rolling grooves of the guide rail and the slider, the slider further including a return passage axially passing through the slider and also first and second curved element circulating R-parts which communicate the return passage, the space and the slider so as to form a rolling element endless circulating passage through which the rolling elements are endlessly circulated, wherein a rate of change expressed as "Dmax−Dmin" becomes extremely small, where Dmax and Dmin are respectively a local maximum and a local minimum of D when a first rolling element of the rolling elements moves a distance corresponding to a rolling element-to-rolling element span, D is expressed as (dx2−dx1)/dx, dx1 is a minute movement quantity of the first rolling element when it moves from the space to the first curved element circulating R-part, and dx2 is a minute movement quantity of a second rolling element of the rolling elements when it moves from the second curved element circulating R-part to the space while the second rolling element is moved in accordance with the movement of the first rolling element by the minute movement quantity dx1.

Note that in the present specification a rolling element-to-rolling element span is directed to a distance between the centers of adjacent rolling elements. In the case where there is a spacer between the adjacent rolling elements, a rolling element-to-rolling element span defines a distance between the centers of adjacent rolling elements interposing the spacer therebetween. On the other hand, in the case where there is no spacer between the adjacent rolling elements, a rolling element-to-rolling element span defines a distance between the centers of adjacent rolling elements which are brought in contact with each other.

In addition, the above-mentioned object can also be achieved by a linear guide device, according to a present invention, comprising:

a plurality of rolling elements;

a guide rail extending in an axial direction thereof and having a rolling element rolling groove which is formed in a side wall thereof and is extended in the axial direction; and a slider including a rolling element rolling groove, which faces the rolling element rolling groove of the guide rail, the slider being supported in a manner that the slider is axially movable through the rolling of the rolling elements put in a space defined between the rolling element rolling grooves of the guide rail and the slider, the slider further including a return passage axially passing through the slider and also first and second curved element circulating R-parts which communicate the return passage, the space and the slider so as to form a rolling element endless circulating passage through which the rolling elements are endlessly circulated, wherein a rate of change expressed as "Dmax−Dmin" is more than 0 and not more than 0.425, where Dmax and Dmin are respectively a local maximum and a local minimum of D when a first rolling element of the rolling elements moves a distance corresponding to a rolling element-to-rolling element span, D is expressed as (dx2−dx1)/dx, dx1 is a minute movement quantity of the first rolling element when it moves from the space to the first curved element circulating R-part, and dx2 is a minute movement quantity of a second rolling element of the rolling elements when it moves from the second curved element circulating R-part to the space while the second rolling element is moved in accordance with the movement of the first rolling element by the minute movement quantity dx1.

Further, the above-mentioned object can also be achieved by a linear guide device comprising:

a plurality of rolling elements;

a guide rail extending in an axial direction thereof and having a rolling element rolling groove which is formed in a side wall thereof and is extended in the axial direction; and a slider including a rolling element rolling groove, which faces the rolling element rolling groove of the guide rail, the slider being supported in a manner that the slider is axially movable through the rolling of the rolling elements put in a space defined between the rolling element rolling grooves of the guide rail and the slider, the slider further including a return passage axially passing through the slider and also first and second curved element circulating R-parts which communicate the return passage, the space and the slider so as to form a rolling element endless circulating passage through which the rolling elements are endlessly circulated, wherein the space functions as a load region and each of the first and second curved element circulating R-parts functions as a non-load region, and wherein a decimal part of a ratio L/P is in the range from 0.25 to 0.39 both inclusive, where L is the whole length of the non-load part and P is a rolling element-to-rolling element span.

In addition to this, it is also an object of present invention to solve the above-mentioned problem in the conventional linear guide device. That is, an object of the present invention is to provide a linear guide device with improvements of the device operability and noise reduction which are easily and reliably realized at low cost.

BRIEF DESCRIPTION OF THE DRAWINGS

FIG. 5 is a graph showing a relation between D (=(dx2−dx1)/dx1) and the i-th position on an n-divided distance corresponding to a ball element movement of a rolling element-to-rolling element span;

FIGS. 9(a), 9(b), 9(c) and 9(d) are graphs showing the result of measuring a variation of a frictional force when the rate of change is varied;

FIG. 12 is a diagram showing a graph useful in explaining a linear guide device which is a third embodiment of the invention. More specifically, FIG. 12 is a graph showing a relation between a rate of change and a decimal part of a value of L/P (L:the whole length of a load part of the element endless circulating raceway, P:(P:rolling element-to-rolling element span);

DETAILED DESCRIPTION OF THE PREFERRED EMBODIMENTS

Figure 1:
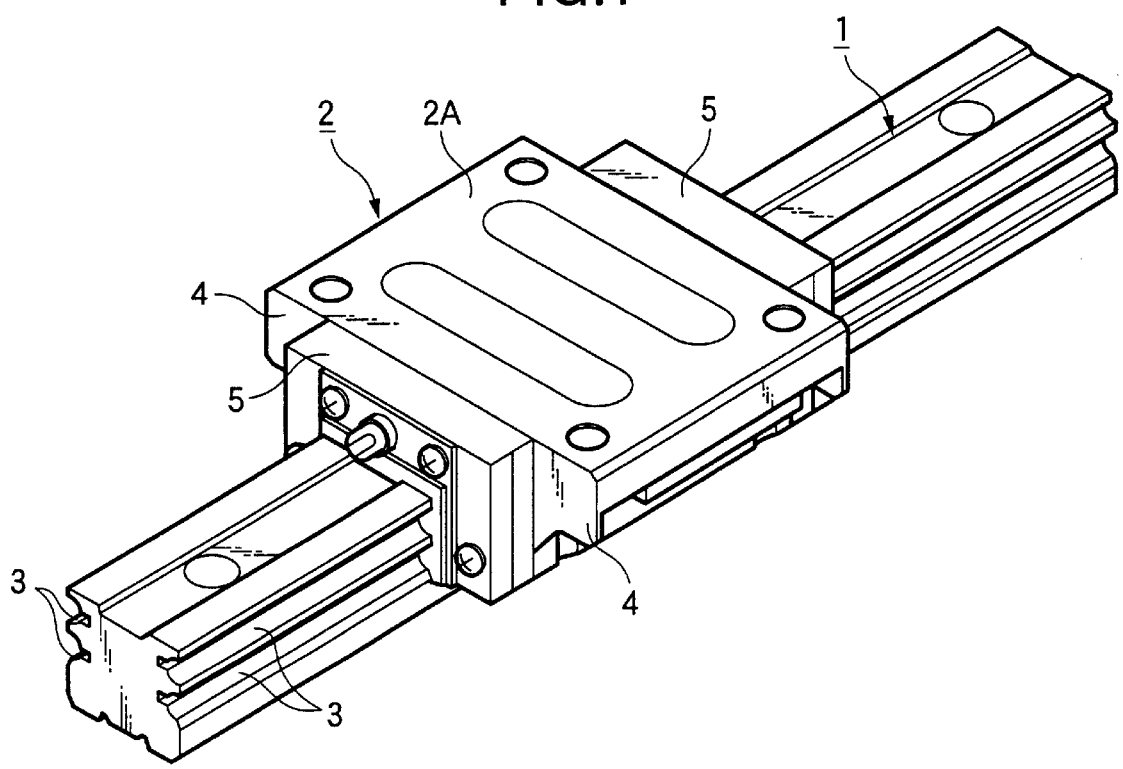
FIG. 1 is a perspective view showing an overall structure of the linear guide device.
Figure 2:
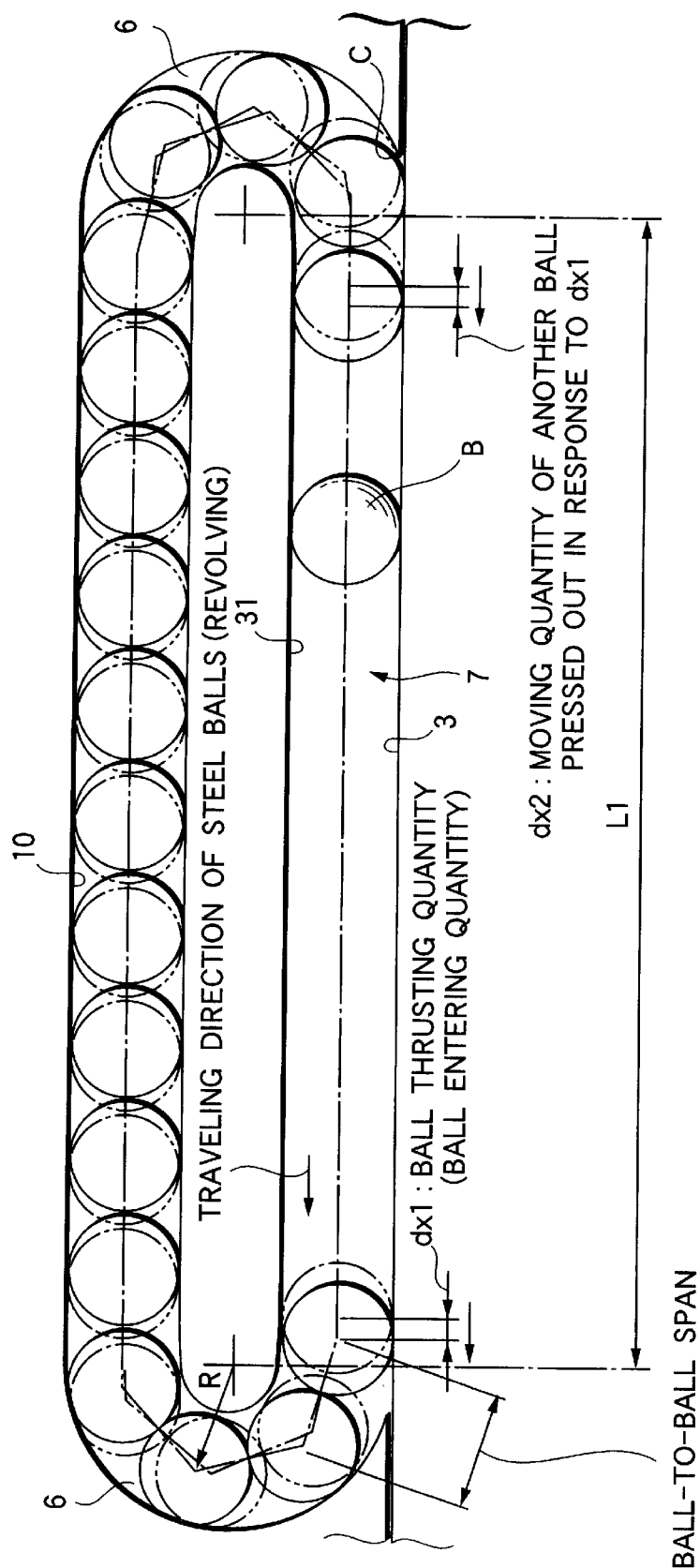
FIG. 2 is a plan view useful in explaining a rolling element endless circulating raceway.
Figure 3:
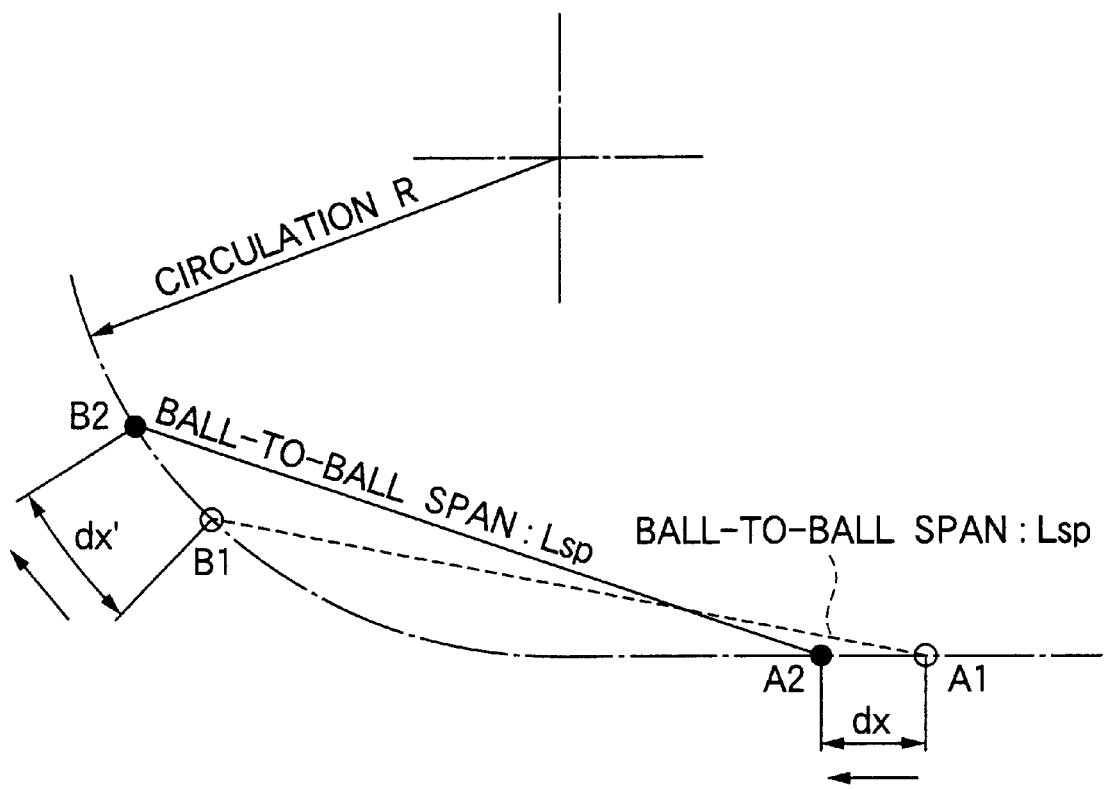
FIG. 3 is an explanatory diagram for explaining a difference caused between minute movement quantities dx1 and dx2 of rolling elements.
Figure 4:
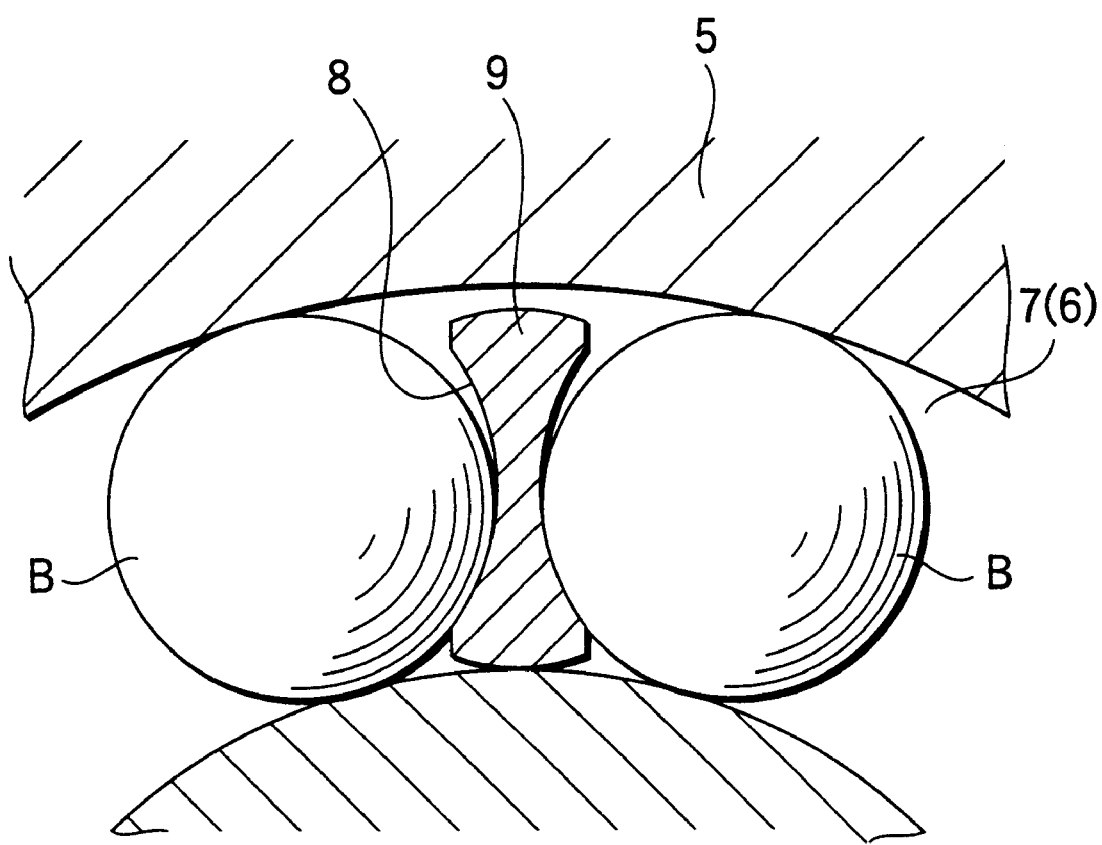
FIG. 4 is a diagram useful in explaining conventional spacers.
Figure 5:
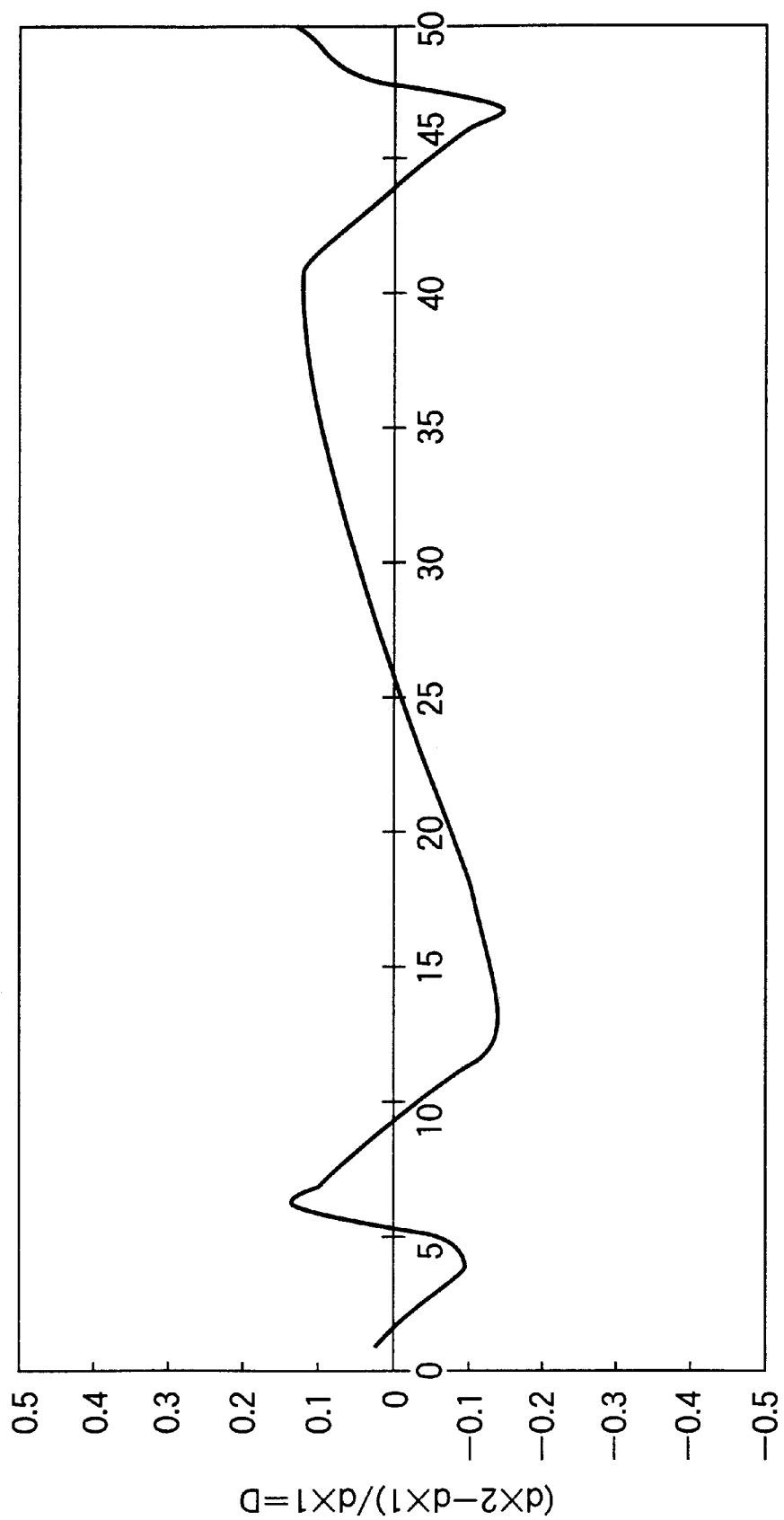
FIG. 5 is a diagram useful in explaining a linear guide device which is a first embodiment of the present invention, and more specifically
Figure 6:
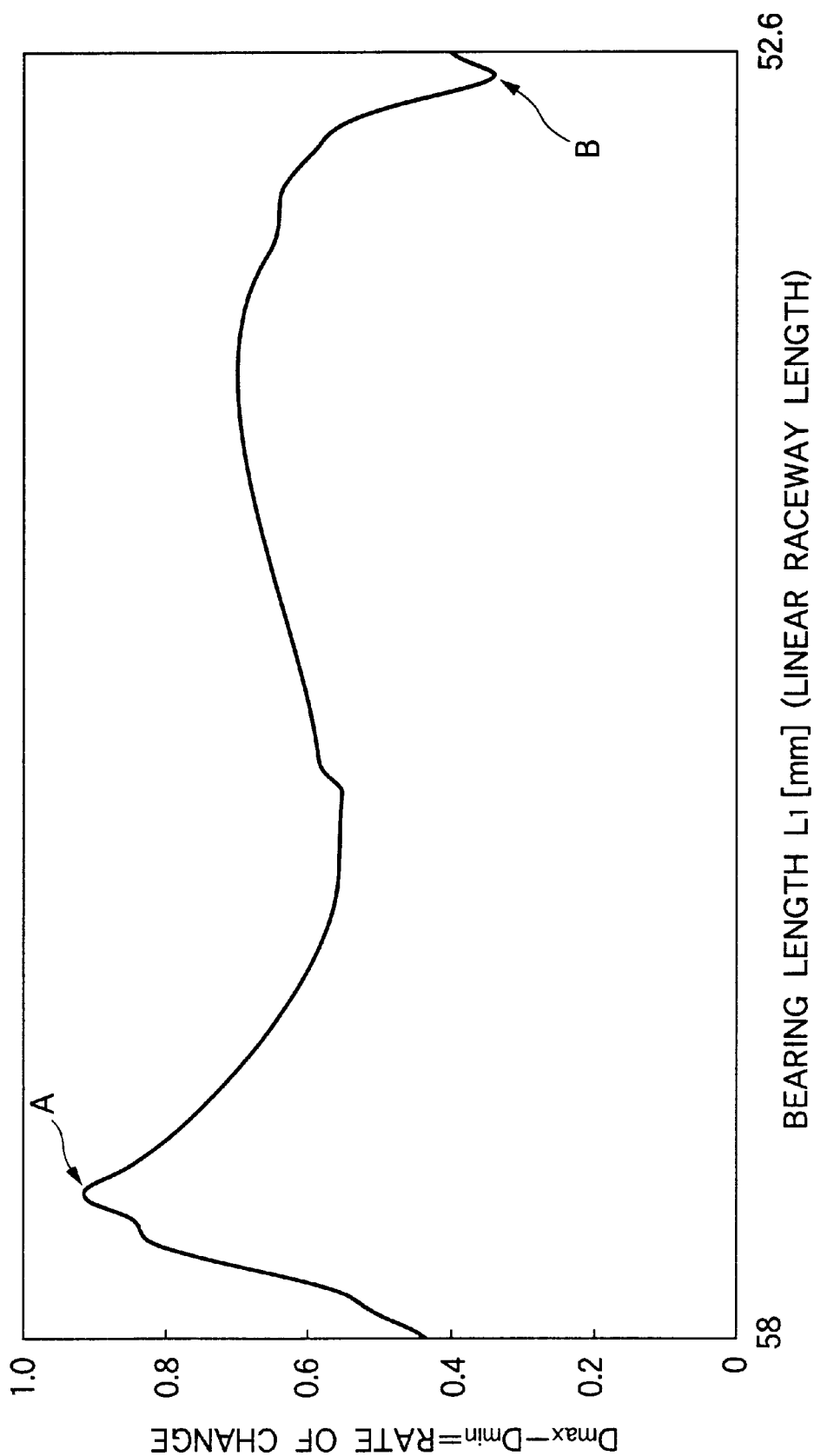
FIG. 6 is a graph showing a variation of a rate of change (=Dmax−Dmin) when a raceway length L1 of the raceway defined between the rolling element rolling grooves is varied a distance corresponding to the rolling element-to-rolling element span.
Figure 7:
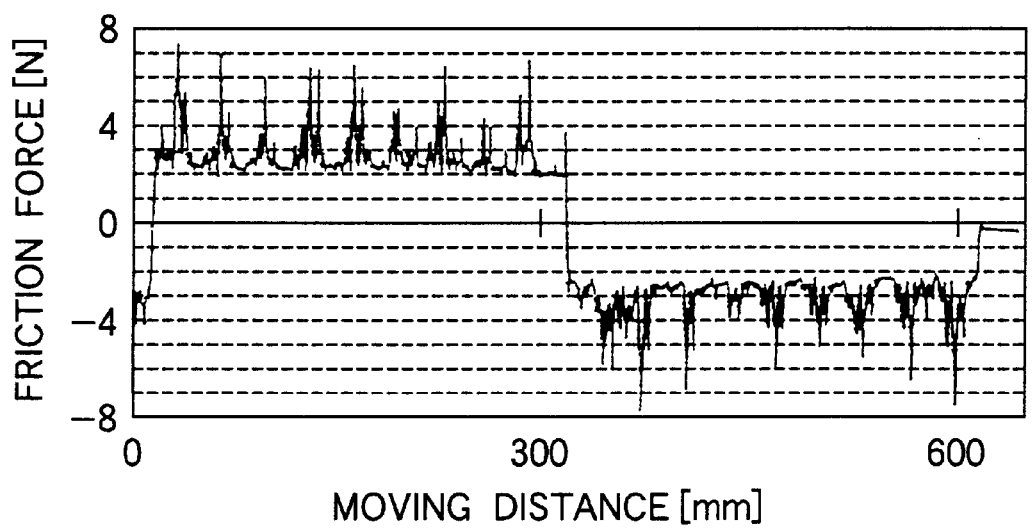
FIG. 7 is a graph showing the result of measuring a variation of a frictional force when the rate of change becomes extremely large in FIG. 6 (at A)
Figure 8:
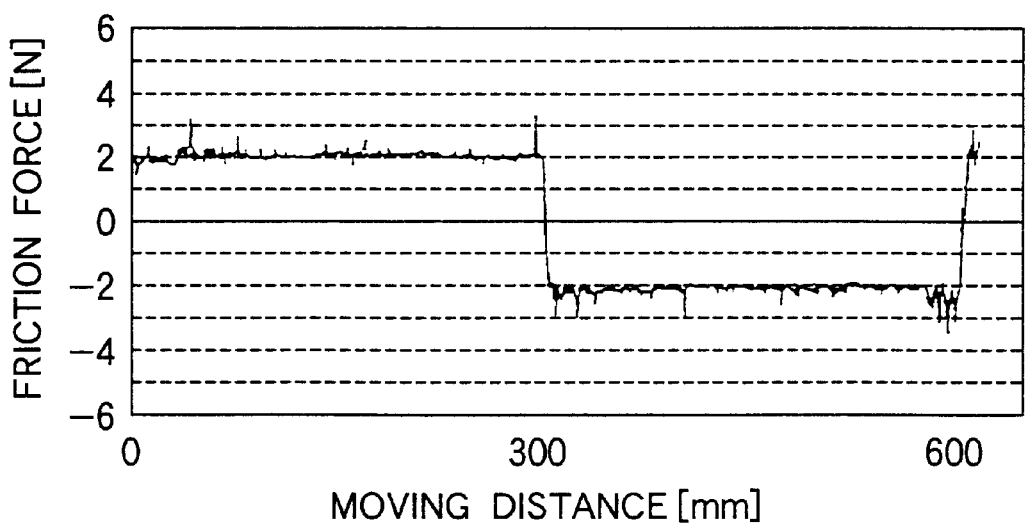
FIG. 8 is a graph showing the result of measuring a variation of a frictional force when the rate of change is extremely small in FIG. 6 (at B)
Figure 10:
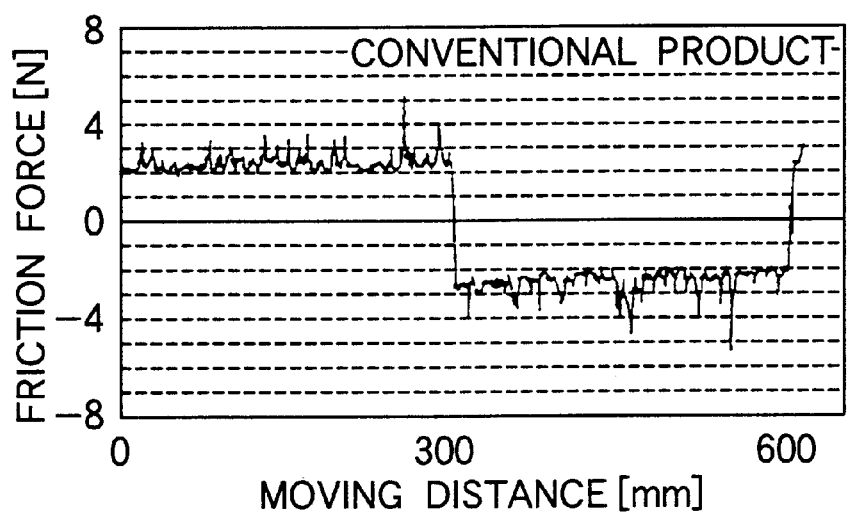
FIG. 10 is a graph showing the result of measuring a variation of a frictional force on a conventional product.
Figure 11:
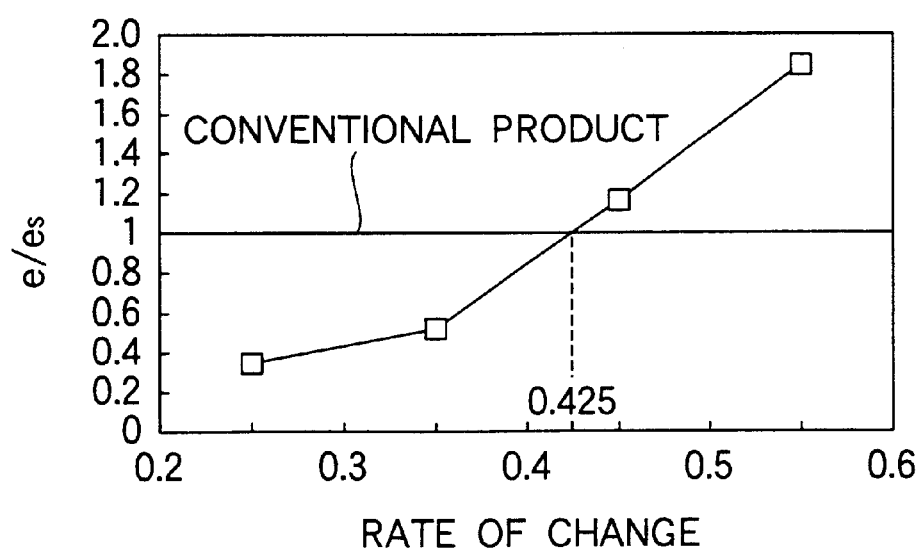
FIG. 11 is a graph showing a relation between a ratio $e/e_s$ of stickiness based on the data of FIGS. 9 and 10 and a rate of change.
Figure 13A:
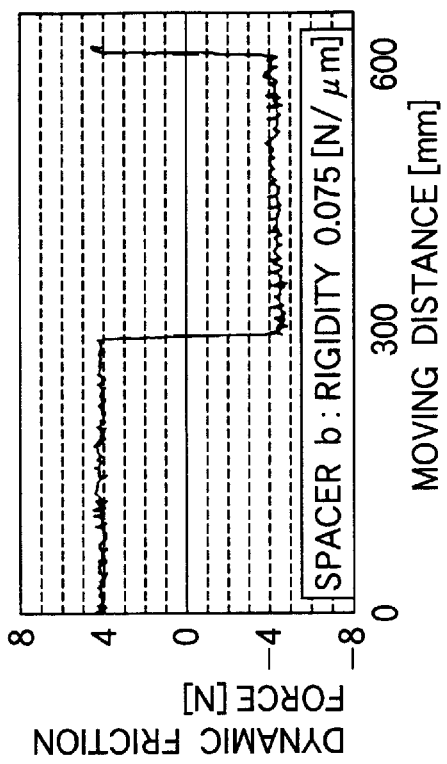
FIGS. 13A, 13B, 13C and 13D are graphically representations of variations of dynamic frictional force in the linear guide device when four types of spacers each being interposed between adjacent steel balls, the spacers each having a rigidity value lower than that of the conventional device.
Figure 13B:
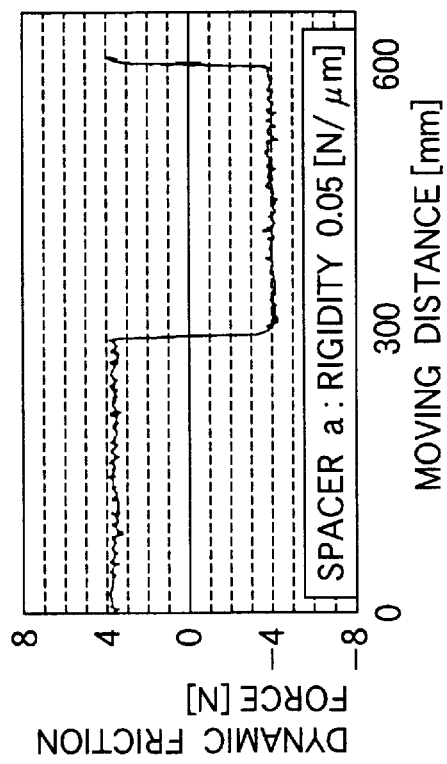
Figure 13C:
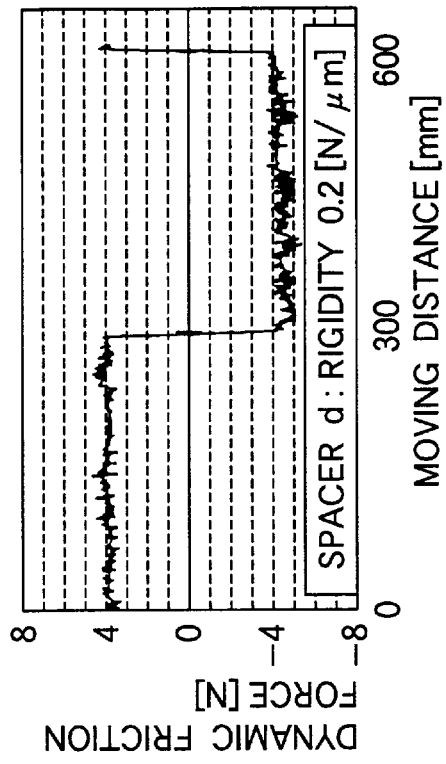
Figure 13D:
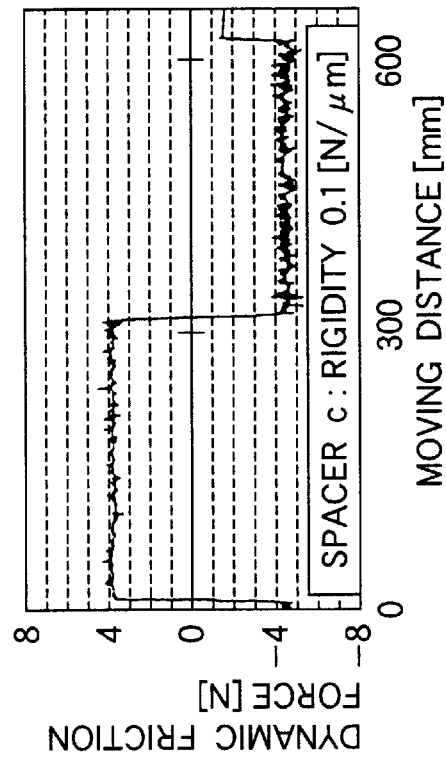

The preferred embodiments of the present invention will be described with reference to the accompanying drawings. FIGS. 5 through 8 are diagrams useful in explaining a linear guide device which is a first embodiment of the present invention. Of those figures, FIG. 5 is a graph showing a relation between D and the i-th position on an n-divided distance corresponding to a ball element movement of a rolling element-to-rolling element span. FIG. 6 is a graph showing a variation of a rate of change when a raceway length L1 of the raceway defined between the rolling element rolling grooves is varied a distance corresponding to the rolling element-to-rolling element span. FIG. 7 is a graph showing the result of measuring a variation of a frictional force when the rate of change becomes extremely large in FIG. 6. FIG. 8 is a graph showing the result of measuring a variation of a frictional force when the rate of change becomes extremely small in FIG. 6. FIGS. 9 to 11 are diagrams for explaining a linear guide device which is a second embodiment of the present invention. FIG. 9 is a graph showing the result of measuring a variation of a frictional force when the rate of change is varied. FIG. 10 is a graph showing the result of measuring a variation of a frictional force on a conventional product. FIG. 11 is a graph showing a relation between a ratio $e/e_s$ of stickiness based on the data of FIGS. 5 and 6 and a rate of change. FIG. 12 is a diagram showing a graph useful in explaining a linear guide device which is a third embodiment of the invention. More specifically, FIG. 12 is a graph showing a relation between a rate of change and a decimal part of a value of L/P (L:the whole length of a non-load region of the element endless circulating raceway, and P:rolling element-to-rolling element span). An overall structure of the linear guide device and a basic structure of the element endless circulating raceway in the respective embodiments are shown in FIGS. 1 and 2. Accordingly, FIGS. 1 and 2 will also be referred to for describing only differences of those structures of the embodiments from those in FIGS. 1 and 2.

A linear guide device which is a first embodiment of the present invention will first be described. Reference is made to FIGS. 1 and 2. The linear guide device is configured so as to locally minimize a rate of change expressed as "Dmax−Dmin". Dmax and Dmin are respectively a local maximum and a local minimum of D, expressed as (dx2−dx1)/dx, which is produced when a steel ball B1 moves a distance corresponding to a rolling element-to-rolling element span. dx1 is a minute movement quantity of the steel ball B1 when it moves from one of the spaces (load regions) defined between rolling element rolling grooves 3 and 31 to one of the curved element circulating R parts 6A (non-load regions). dx2 is a minute movement quantity of another steel ball B2 when it moves from the other curved element circulating R part 6B (non-load region) to the space (load region) in accordance with the movement of the former steel ball B1 by the minute movement quantity dx1. The linear guide device thus configured secures a smooth revolving motion of the steel balls B and improves the device operability without causing the zig-zag phenomenon of the rolling elements and a great variation of dynamic frictional forces.

The first embodiment will be described in more detail.

FIG. 5 is a graph showing a relation between D=(dx2−dx1)/dx1) and the i-th position on an n-divided (n=50) distance corresponding to a ball element movement of a rolling element-to-rolling element span. In other words, the graph shows a variation of D when the steel balls B move by one phase. In the figure, a difference between a maximum value Dmax of a D value and a minimum value Dmin of the same is defined as a rate of change.

FIG. 6 is a graph showing a variation of a rate of change (=Dmax−Dmin) when a raceway length L1 (see FIG. 2) of the raceway defined between the rolling element rolling grooves 3, 31 is varied a distance (=5.4 mm in the embodiment) corresponding to the rolling element-to-rolling element span (1 phase). As seen from FIG. 6, the rate of change becomes extremely large at a point A, and extremely small at a point B. The change rate takes its profile of FIG. 6 every time the raceway length L1 changes by a distance corresponding to the rolling element-to-rolling element span. The result of measuring a variation of a frictional force when the rate of change becomes extremely large (at a point A) is shown in FIG. 7. The result of measuring a variation of a frictional force when the rate of change becomes extremely small (at a point B) is shown in FIG. 8. As seen from FIGS. 7 and 8, a value of a stickiness at the "local minimum point B" in the graph is remarkably smaller than that at the "local maximum point A". Here, the stickiness value indicates a level of the operability of the device (viz., a minute variation of the dynamic frictional force: the smaller the stickiness value is, the better the operability is.). This indicates that the operability is remarkably improved. In the embodiment, to improve the operability, a curve profiled as shown in FIG. 5 is plotted by varying the raceway length (bearing length) L1, and then the device is designed so as to locally minimize the change rate. Other design approaches for the operability improvement are present, as a matter of course: to change the size of the curved element circulating R parts 6; to change the tongue shape or the element pickup configuration of the end cap, viz., to change an element pickup position (tongue tip position); to change the rolling element-to-rolling element span P by interposing a holding piece between the adjacent rolling elements, and others.

A linear guide device which is a second embodiment of the present invention will be described with reference to FIGS. 9 through 11.

In the linear guide device, the operability is improved such that the change rate (Dmax−Dmin) is selected to be within a range from 0 to 0.425.

Figure 9A:
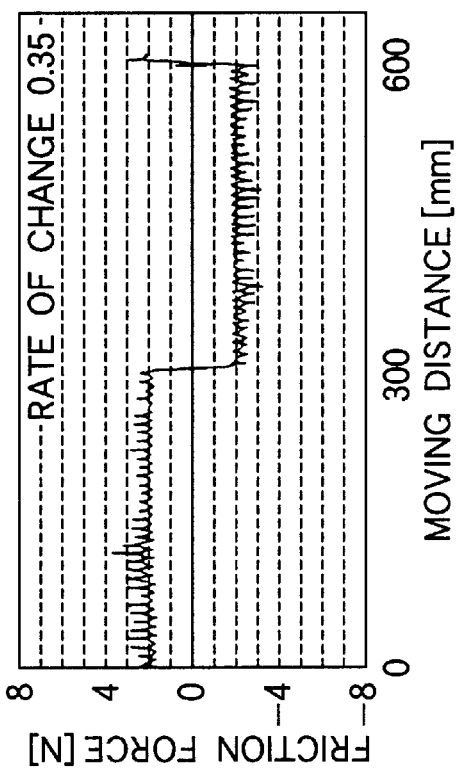
FIGS. 9(a), 9(b), 9(c) and 9(d) are diagrams for explaining a linear guide device which is a second embodiment of the present invention. More particulary.
Figure 9B:
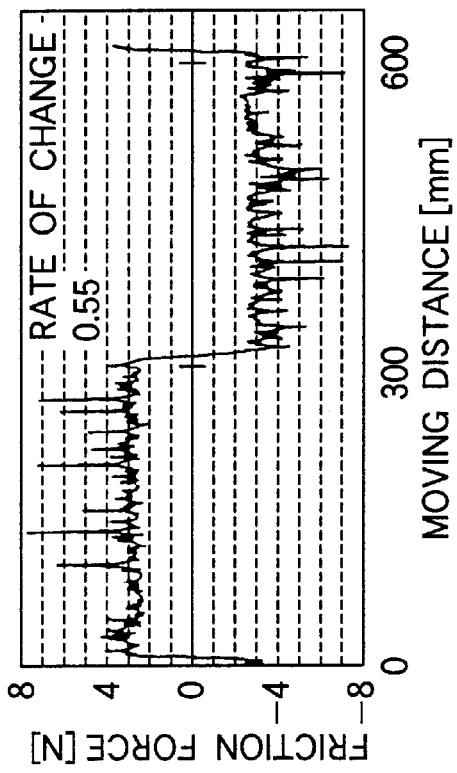
Figure 9C:
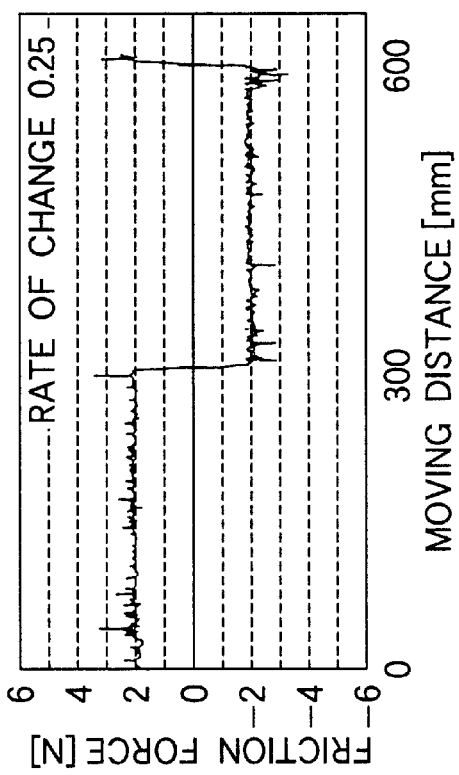
Figure 9D:
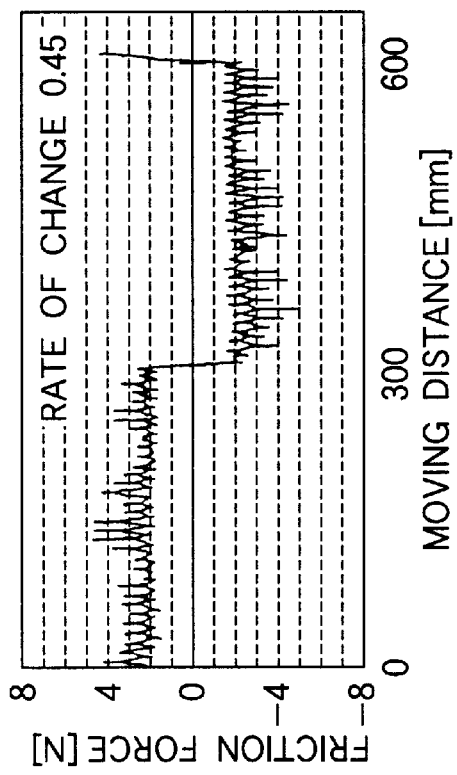

FIGS. 9A and 9B are graphs showing the results of measuring a variation of a frictional force when the rate of change is varied. Specifically, the dynamic frictional force is measured at four different change rate values (0.25, 0.35, 0.45, 0.55). FIG. 10 is a graph showing the result of measuring a variation of a frictional force on a conventional product. FIG. 11 is a graph showing a variation profile of a ratio $e/e_s$ of stickiness at the four change rate values shown in FIGS. 9A and 9B. Here, e represents one of the stickiness of the invention device, and $e_s$ is the stickiness of the conventional product.

As seen from FIG. 11, the operability of the invention device is improved over the conventional device at 0.425 or smaller in a region where $e/e_s \leq 1$. At present, it is difficult that the lower limit value of the change rate is selected to be smaller than 0.1 because of limitation by the size of the curved element circulating R part, so long as the dimensions of the device currently used are used.

A linear guide device which is a third embodiment of the invention will be described with reference to FIG. 12. In this linear guide device, the operability is improved under the condition that a decimal part of a ratio L/P is within 0.25 to 0.39 where L is the whole length of a load part of said element endless circulating raceway (L=L$_1$+2πR), and P is a rolling element-to-rolling element span. FIG. 12 is a graph showing a variation profile of a rate of change (Dmax−dmin) with respect to a decimal part of a value of L/P. As seen from the figure, the change rage takes the local minimum values in a range of the decimal part from 0.2 to 0.45, and takes the local minimum value between 0.2 to 0.45. This fact teaches that design dimensions of the device are selected so that the decimal part of L/P is within a range from 0.25 to 0.39, in order to avoid the local maximum values of the change rate. More preferably, the decimal part of the change rate is within 0.3 to 0.35, which are near a value providing the local minimum value of the change rate. In actual design, the length of each curved element circulating R part is (n1+α) times as large as the rolling element-to-rolling element span P ($0.8 \leq \alpha < 1.0$), and the raceway length L1 is (n2+β) times as large as the rolling element-to-rolling element span P ($0.5 \leq \beta < 0.8$) (n1, n2: a natural number (1, 2, 3, . . . )).

While the rolling element is the steel ball in the above-mentioned embodiments, it may be a ceramic ball.

Note that although a linear guide device having a linear-shaped rail is explained in the above-mentioned embodiment, it is possible to apply the present invention to a linear guide device having a curve-shaped rail.

Figure 14:
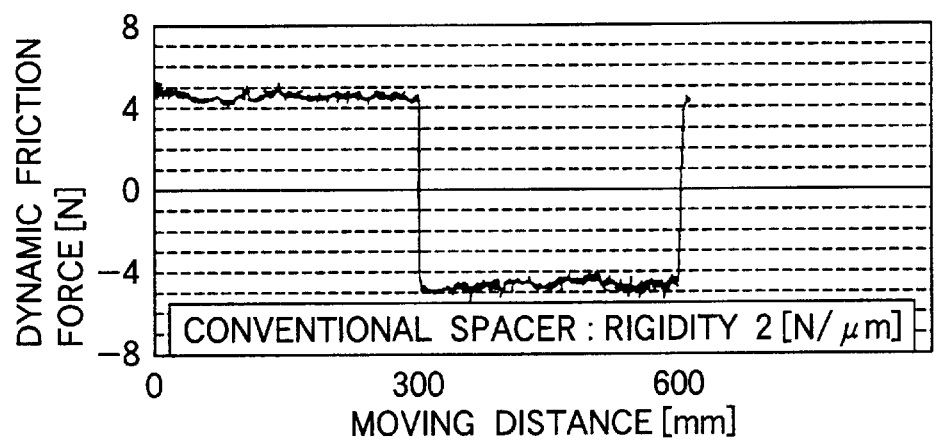
FIG. 14 is a graphically representation of a variation of dynamic frictional force in the linear guide device when conventional spacers each being interposed between adjacent steel balls.
Figure 15:
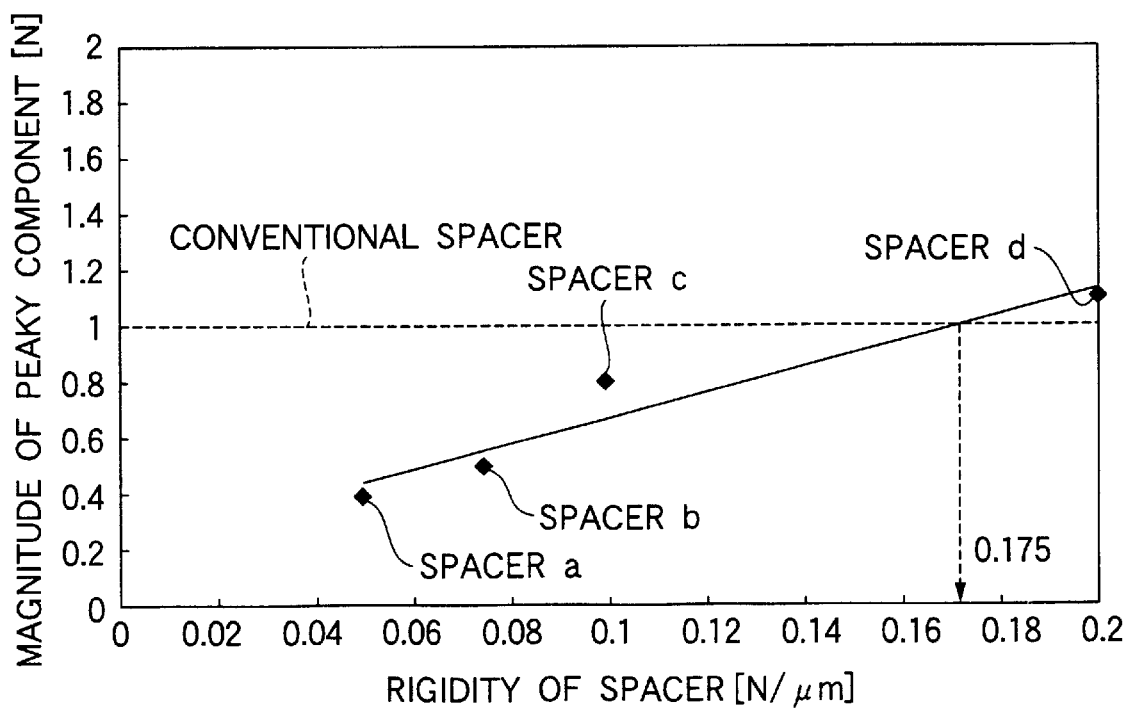
FIG. 15 is a graph showing a relation between a size of a stickiness and a rigidity value of the spacer.
Figure 16:
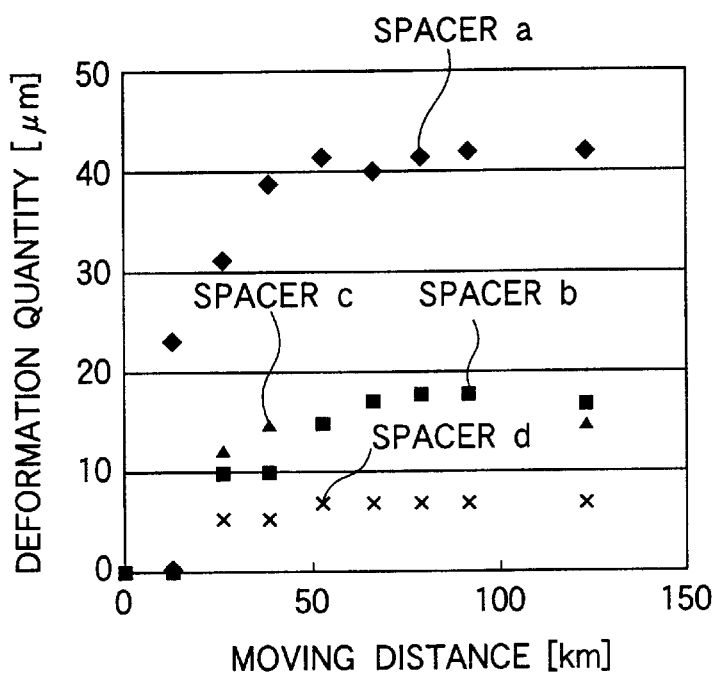
FIG. 16 is a graph showing a relation between deformation quantities of spacers of different rigidity values with respect to their movement distance.
Figure 17:
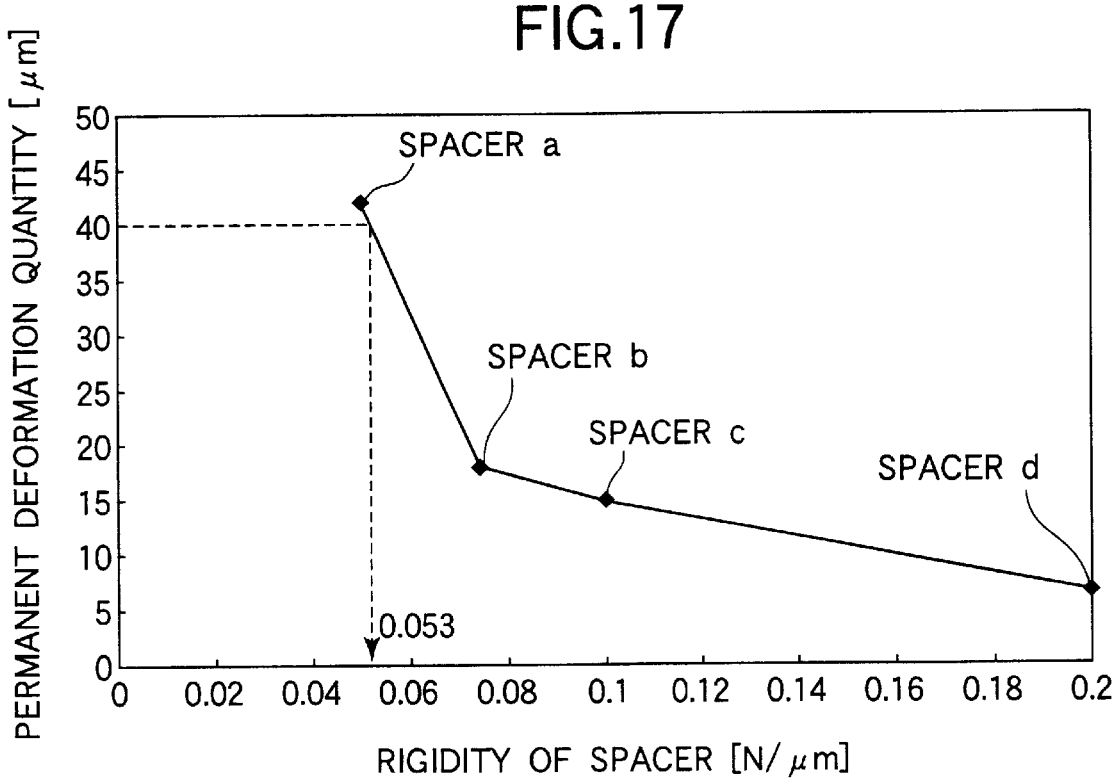
FIG. 17 is a graph showing a relation between permanent deformation quantities of different spacers with respect to their rigidity values.

Hereinafter, the other preferred embodiment of the present invention will be described with reference to the accompanying drawings. FIG. 13 is a graphically representation of variations of dynamic frictional force in the linear guide device when four types of spacers each being interposed between adjacent steel balls, the spacers each having a rigidity value lower than that of the conventional device. FIG. 14 is a graphically representation of variations of dynamic frictional force in the linear guide device when conventional spacers each being interposed between adjacent steel balls. FIG. 15 is a graph showing a relation between a size of a stickiness and a rigidity value of the spacer. FIG. 16 is a graph showing a relation between deformation quantities of spacers of different rigidity values with respect to their movement distance. FIG. 17 is a graph showing a relation between permanent deformation quantities of different spacers with respect to their rigidity values. The linear guide device of the embodiment is the same as the conventional one shown in FIG. 1 except that spacers each being interposed between the adjacent steel balls in the element endless circulating raceway are different from those in the conventional one. Description will be given placing emphasis on the difference of them.

The linear guide device is characteristically featured in that a rigidity value of each spacer being interposed between the adjacent steel balls B in the element endless circulating raceway 7 is selected to be within 0.053 N/μm to 0.175 N/μm, lower than that of the conventional one. A difference (dx2−dx1) between a minute movement quantity dx1 of a steel ball when it moves from the load side to the non-load side and a minute movement quantity dx2 of another steel ball when it moves from the non-load side to the load side responsively when it moves by the minute movement quantity dx1 is absorbed by using the spacers of low rigidity. As a result, the zig-zag phenomenon of the steel balls and a variation of dynamic frictional force are prevented, so that the improvement of the device operability and noise reduction are easily realized at low cost.

Here, the term "rigidity value" means "a rate of change of the element-to-element pitch to a compression force applied to between the rolling elements" under the condition that a spacer is interposed between the adjacent rolling elements. The rigidity value (N/μm)=compression force (N) applied to between the rolling elements/a quantity (μm) of change of the element-to-element pitch.

The rigidity value of the spacer may be put within the range of 0.053 N/μm to 0.175 N/μm by 1) designing the structure of the spacer so as to have a necessary rigidity value, 2) selecting a material of the spacer so as to have a necessary rigidity value, or the like. The latter is simple and hence use of it is preferable. A material of the spacer, which is good in moldability and rub resistance and has a rigidity value smaller than any of 0.053 N/μm to 0.175 N/μm, is soft polytethylene. A material of elastomer or the like may be used. In this case, it is essential to use a material which is good in oil resistance, heat resistance, and creep characteristic. For such a material, PELPRENE (Polyester Elastomer) is preferable, more preferably S-series or EN series (trade name, manufactured by Toyobo corporation in Japan) of PELPRENE (Polyester Elastomer).

The reason why the rigidity value of the spacer is selected to be within 0.053 N/μm to 0.175 N/μm, will be described.

Variations of dynamic frictional force in the linear guide device when four types of spacers a to d (whose rigidity values are 0.05, 0.075, 0.1, and 0.2 (N/μm) in this order), each being interposed between adjacent steel balls, which the spacers each have a rigidity value lower than that of the conventional device are shown in FIGS. 13A to 13D. A variation of dynamic frictional force in the linear guide device when conventional spacers (whose rigidity value is 2 N/μm) each being interposed between adjacent steel balls, is shown in FIG. 14. FIG. 15 is a graph showing a relation between a size of a stickiness and a rigidity value of the spacer. Here, the stickiness value indicates a level of the operability of the device based on the data of FIGS. 13 and 14 (viz., a minute variation of the dynamic frictional force: the smaller the stickiness value is, the better the operability is.).

As seen from FIG. 15, in a region where the rigidity value is smaller than 0.175 N/μm, the stickiness value is smaller than 1 N of the stickiness value of the conventional spacer. Accordingly, it will be understood that the operability is improved in the region where the rigidity value is smaller than 0.175 N/μm. FIG. 15 also teaches that as the rigidity value of the spacer is smaller, the operability is more improved. However, as the rigidity value of the spacer is smaller, a value of a permanent deformation of the element-to-element pitch, viz., the durability, which is caused by a bending force in the curved element circulating R parts, repetitive forces acting during the rolling of the steel balls, and the like is sometimes problematic.

A relation between deformation quantities of spacers a to d with respect to their movement distance is graphically shown in FIG. 16, for the purpose of presenting the durability of those spacers. A relation between permanent deformation quantities of different spacers with respect to their rigidity values when the movement distance is about 125 km is shown in FIG. 17. In the linear guide device using the ordinary spacers, when a quantity of permanent deformation is 40 μm or larger, an element-to-element gap in the steel ball train is too large, so that smooth revolution of the steel balls and the spacers is hindered, and the durability of them is considerably reduced. In this connection, FIG. 17 teaches that the rigidity value of the spacer is at least 0.053 N/μm.

It is for this reason that the rigidity value of the spacer is selected to be within 0.053 N/μm to 0.175 N/μm.

Thus, in the linear guide device, the spacers having the rigidity values selected as described above are each interposed between the adjacent spacers. Accordingly, even when a compression force acts on the rolling element train because of the raceway length is varied by machining error of parts and the like, the linear guide device of the invention secures the operability and noise characteristic, which are comparable with those of the linear guide device using the conventional spacers.

It is preferable that the spacers constructed according to the invention are each interposed between the adjacent steel balls for all the steel balls. Even where one or several locations where spacers are not interposed are present, it is empirically confirmed that the operability and noise characteristic of the linear guide device of the invention are superior to those of the conventional one not using the spacers. In this case, it is preferable that those locations are oppositely disposed with respect to the rolling element train (so that the locations are not contiguous).

In the above-mentioned embodiment, a single spacer is interposed between the adjacent steel balls B. If required, coupled spacers may also be interposed therebetween.

In the embodiment mentioned above, the spacer is shaped like a column. It may be replaced with a cylindrical spacer, as a matter off course.

In the embodiment, each concave surface of the spacer is shaped so as to resemble the spherical surface of the steel ball. If necessary, its concave surface may be conic or shaped like a Gothic arch.

While the rolling element is the steel ball in the above-mentioned embodiment, it may be a ceramic ball.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As seen from the foregoing description, the present invention succeeds in providing a linear guide device which secures a smooth revolving motion of rolling elements and improves the device operability without causing the zig-zag phenomenon of the rolling elements and a great variation of dynamic frictional forces.

As seen from the foregoing description, the linear guide device of the invention is not affected by a difference that is created between a minute movement quantity dx1 of a steel ball when it moves from one linear raceway as the load side to one curved element circulating R part as the non-load side and a minute movement quantity dx2 of another steel ball when it moves from the other curved element circulating R part as the non-load side to the linear raceway as the load side responsively when it moves by the minute movement quantity dx1. Therefore, the improvement of the operability and the reduction of noise are readily realized at low cost.

What is claimed is:

1. A linear guide device comprising:

a plurality of rolling elements;

a guide rail extending in an axial direction thereof and having a rolling element rolling groove which is formed in a side wall thereof and is extended in the axial direction; and a slider including a rolling element rolling groove, which faces said rolling element rolling groove of said guide rail, said slider being supported in a manner that said slider is axially movable through the rolling of said rolling elements put in a space defined between said rolling element rolling grooves of said guide rail and said slider, said slider further including a return passage axially passing through said slider and also first and second curved element circulating R-parts which communicate said return passage, said space and said slider so as to form a rolling element endless circulating passage through which the rolling elements are endlessly circulated, a plurality of spacers each interposed between the rolling elements adjacent to each other in the circulating direction, and each of said spacers has a rigidity value of each said spacer is selected to be within 0.053 N/μm to 0.175 N/μm.

2. The linear guide device according to claim 1, wherein said spacers are made of polyethylene.

3. The linear guide device according to claim 1, wherein each of said spacers has a rigidity value selected to be within 0.075 N/μm to 0.1 N/μm.

* * * * *